(12) United States Patent
Liu et al.

(10) Patent No.: US 9,774,083 B2
(45) Date of Patent: Sep. 26, 2017

(54) SWITCHABLE PI SHAPE ANTENNA

(71) Applicant: Futurewei Technologies, Inc., Plano, TX (US)

(72) Inventors: Hongwei Liu, San Diego, CA (US); Ning Ma, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 14/842,665

(22) Filed: Sep. 1, 2015

(65) Prior Publication Data
US 2015/0372384 A1 Dec. 24, 2015

Related U.S. Application Data

(63) Continuation of application No. 14/274,474, filed on May 9, 2014, now Pat. No. 9,184,494.

(51) Int. Cl.
*H04W 72/00* (2009.01)
*H01Q 5/335* (2015.01)
(Continued)

(52) U.S. Cl.
CPC ............. *H01Q 5/335* (2015.01); *H01Q 1/243* (2013.01); *H01Q 1/38* (2013.01); *H01Q 1/50* (2013.01);
(Continued)

(58) Field of Classification Search
USPC .......................... 455/450; 343/845, 702, 906
See application file for complete search history.

(56) References Cited

U.S. PATENT DOCUMENTS 7,304,611 B2 * 12/2007 Yuanzhu ............. H01Q 9/0442
343/700 MS
2006/0187128 A1 8/2006 Lu et al.
(Continued)

FOREIGN PATENT DOCUMENTS

CN 201590488 U 9/2010
CN 203104423 U 7/2013
(Continued)

OTHER PUBLICATIONS

Tripathi, R. et al., "Pi Shape Slot Loaded Patch Antenna for Wi-Max Applications," Special Issue of Intl. Journal of Computer Applications (0975-8887) on Electronics, Information and Communication Engineering —ICEICE No. 6 (Dec. 2011).
(Continued)

*Primary Examiner* — David Q Nguyen
(74) *Attorney, Agent, or Firm* — Futurewei Technologies, Inc.

(57) ABSTRACT

A mobile device including a housing having a distal end, and electronics disposed in the housing configured to operate the mobile device. A connector is coupled to the electronics, and a Pi-shaped antenna has a coupling coupled to the connector to create a resonance using the connector. The Pi-shaped antenna and the connector are configured to wirelessly send and receive the wireless signals. An impedance matching network matches the impedance of the electronics to the Pi-shaped antenna. In some embodiments, the impedance matching network is switchable by the electronics and is configured to match an impedance of the electronics to the Pi-shaped antenna in at least two states, over multiple RF bands.

29 Claims, 7 Drawing Sheets

(51) Int. Cl.
    *H04L 25/02* (2006.01)
    *H04W 72/04* (2009.01)
    *H01Q 1/24* (2006.01)
    *H01Q 5/371* (2015.01)
    *H01Q 1/38* (2006.01)
    *H01Q 1/50* (2006.01)
    *H01Q 9/04* (2006.01)

(52) U.S. Cl.
    CPC ............... *H01Q 5/371* (2015.01); *H01Q 9/04* (2013.01); *H04L 25/02* (2013.01); *H04L 25/0278* (2013.01); *H04W 72/0453* (2013.01)

(56) References Cited

U.S. PATENT DOCUMENTS

| | | | |
|---|---|---|---|
| 2009/0146906 A1 | 6/2009 | Pros et al. | |
| 2011/0080333 A1* | 4/2011 | Wu | H01Q 1/243 343/906 |
| 2011/0205138 A1* | 8/2011 | Yanagi | H01Q 9/42 343/845 |
| 2012/0032858 A1 | 2/2012 | Chang et al. | |
| 2012/0041699 A1 | 2/2012 | Sestok | |
| 2012/0313830 A1 | 12/2012 | Lee | |
| 2012/0319918 A1 | 12/2012 | Ramachandran et al. | |
| 2013/0120213 A1 | 5/2013 | Cetiner et al. | |
| 2014/0002315 A1* | 1/2014 | Lim | H01P 11/00 343/702 |
| 2014/0313088 A1 | 10/2014 | Rozenblit et al. | |
| 2015/0280771 A1 | 10/2015 | Mow et al. | |

FOREIGN PATENT DOCUMENTS

| | | |
|---|---|---|
| CN | 103346394 A | 9/2013 |
| EP | 2405534 A1 | 1/2012 |
| EP | 2562867 A1 | 2/2013 |
| EP | 2677600 A1 | 12/2013 |
| KR | 20120004338 A | 1/2012 |

OTHER PUBLICATIONS

Intl. Search Report for PCT/CN2015/078380 (Jul. 22, 2015). 13 pages.

* cited by examiner

SWITCHABLE PI SHAPE ANTENNA

CROSS-REFERENCE TO RELATED APPLICATIONS

The present application is a continuation of U.S. patent application Ser. No. 14/274,474, filed May 9, 2014 by Hongwei Liu, et al. and entitled "SWITCHABLE PI SHAPE ANTENNA," which is incorporated herein by reference as if reproduced in their entirety.

FIELD OF DISCLOSURE

This disclosure is directed to antennas, and more particularly to low profile antennas used in advanced mobile devices including smartphones to cover popular bands.

BACKGROUND

Wireless mobile devices including smartphones require low profile antennas to meet desired product form factors. The available inner dimension (ID) of these devices is limited due to numerous factors, including other component layout design.

The conventional T-shape antenna is commonly used in smartphones, which T-shaped antenna is good to cover third generation (3G) bands without a USB connector presented in the device housing. In fourth generation (4G) long term evolution (LTE) devices, the more popular bands are 704-960 MHz (LTE B17, B20, G850, G900) & 1710-2170 MHz (DCS, PCS, AWS) to 2500-2690 MHz (LTE B7). The conventional T-shaped antenna is limited in band coverage and is not ideally suitable for these popular bands.

SUMMARY

A mobile device operable over a plurality of bands using an antenna, a connector configured to create a resonance, and having a passive or switchable impedance matching network.

In one embodiment, the mobile device comprises a housing having a distal end, and electronics disposed in the housing and configured to operate the mobile device. The electronics are configured to communicate wireless signals including voice calls and text messages. A connector is coupled to the electronics. A Pi-shaped antenna is disposed at the housing distal end, the Pi-shaped antenna having a coupling coupled to the connector and configured to create a resonance using the connector. The Pi-shaped antenna and the connector are configured to wirelessly send and receive the wireless signals. An impedance matching network is coupled between the electronics and the Pi-shaped antenna, the impedance matching network configured to match an impedance of the electronics to the Pi-shaped antenna.

In some embodiments, the impedance matching network is switchable by the electronics and configured to match an impedance of the electronics in at least two states, over multiple RF bands. In some embodiments, the Pi-shaped connector has a first leg comprising the coupling, a second leg and third leg, the first leg coupled to the connector, the second leg and the third leg forming a second stripline and a third stripline, respectively. The Pi-shaped antenna is a stripline antenna, and the impedance matching network comprises a switch, capacitors and inductors. The Pi-shaped antenna is disposed along an edge of the housing distal end.

In some embodiments, the connector is one of a USB connector, an earphone connector, a microphone connector and a memory slot connector. The electronics may comprise an RF driver configured to operate in long term evolution (LTE) band B17, B20 and B7, wherein the antenna and the connector create the resonance at band B7. The connector has a shell, wherein the coupling is coupled to the shell.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

This disclosure provides a mobile device including a low profile Pi-shaped antenna including a switchable design configured to cover multiple popular 4G LTE bands from B17 to B7, as well as a high band B41. A Pi-shaped antenna is defined as antenna having at least two arms each coupled to a radiating member and together forming the shape of the greek symbol Pi.

Figure 1:
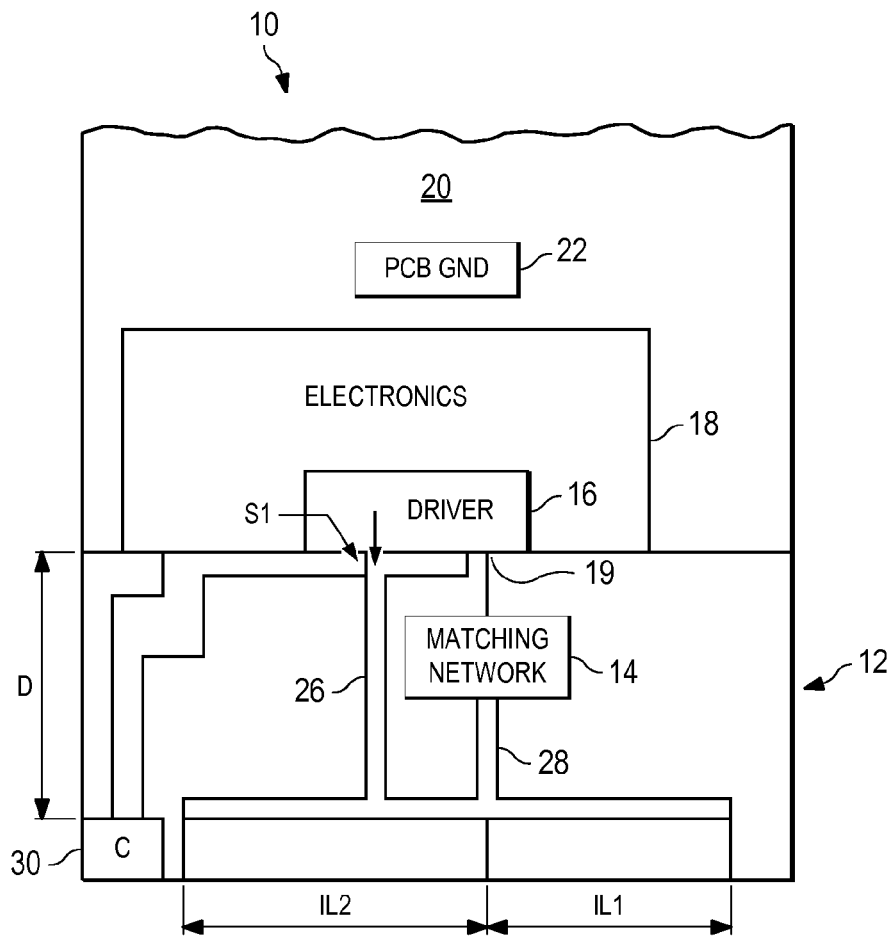
FIG. 1 illustrates a mobile device having a switchable Pi-shaped antenna, a connector, and an impedance matching network.

Referring to FIG. 1, there is shown a mobile device 10 including a switchable Pi-shaped antenna 12 having three arms, IL1, IL2 and coupling S1. Coupling S1 in combination with another component, such as a connector as will be described hereafter, is advantageously configured to provide a resonance to create a high band of the Pi-shaped antenna 12, thus extending the bandwidth of the antenna on the mobile device 10. In addition, an impedance matching network 14 is configured to impedance match the antenna 12 to a radio frequency (RF) drive circuit 16 forming part of the device electronics 18. Impedance matching network 14 may be passive or active as will be described below. Drive circuit 16 is coupled to impedance matching network 14 via a feedpoint 19, and includes a RF transceiver operable to communicate over multiple RF bands, such as LTE bands B17, B20 and B7. Bands LTE B17, B20, G850, G900 are 704-960 MHz) & band LTE B7 is 1710-2170 MHz (DCS, PCS, AWS) to 2500-2690 MHz.

Electronics 18 form part of a printed circuit board (PCB) 20 and are configured to operate the mobile device in the above mentioned bands. Electronics 18 may include a processor, memory, input/output circuits, a display, wireless transceivers and a battery, as are conventional in mobile devices, including smartphones, tablets and so forth. For instance, the electronics 18 of mobile device 10 is operable to place and receive voice calls, text message, images, video files, game files, and other wireless communication signals, such as a mobile phone. A PCB ground is shown at 22, and may form an RF ground and backplane for antenna 12. Coupling S1 couples the drive circuit 16 of electronics 18 to feedline 26 of antenna 12. Coupling S1 also is coupled to a device connector 30, with coupling S1 comprising a capacitive coupling. The impedance matching network 14 is controlled by electronics circuit 18 and enables the antenna 12 to be selectively switched between two states to effectively cover multiple bands, including the popular 4G LTE bands from low bands B17, B20 to high bands B7, and B41 if desired.

Figure 2:
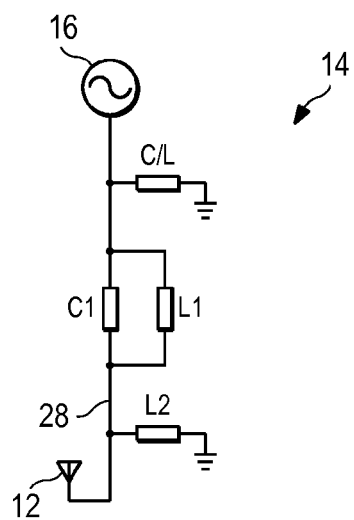
FIG. 2 illustrates the impedance matching network configured as a passive network.

FIG. 2 illustrates a schematic of the impedance matching network 14 forming a passive impedance matching network. The impedance matching network 14 comprises inductor L1, capacitor C1, C/L components, and inductor L2, where inductor L2 is used for matching the impedance of the antenna 12 for both the low and the high bands. By way of example, impedance matching network 14 is configured to impedance match the driver circuit 16 to antenna 12 over the frequency range from low bands band B17 and B20 to high band B7 and B41. In one embodiment the antenna 12 is a stripline antenna and is also tuned by the coupling S1, and the dimensions of the components of impedance matching network 14, specifically the length of inductors L1 and L2, and the IL2/coupling of coupling S1.

Referring to FIG. 1, by way of example in one embodiment, dimension D is 8 mm, the length of IL1 is 22 mm, and the length of IL2 is 30 mm, depending on the PCB dimensions. Inductor L1 may have a value of 2 nH, and capacitor C1 may have a value of 1.5 pF, and L2 may have a value of 4.7 nH. The feedpoint 19 is off the center of the PCB 10 mm. Antenna arms IL1 and IL2 are straight and thick to improve the low band. Coupling S1 couples the drive circuitry 16 of the PCB 20 to the antenna radiators with USB to create the high band. In other embodiments, the values and dimensions of these components may be different and limitation to these values and dimensions is not to be inferred.

Figure 3:
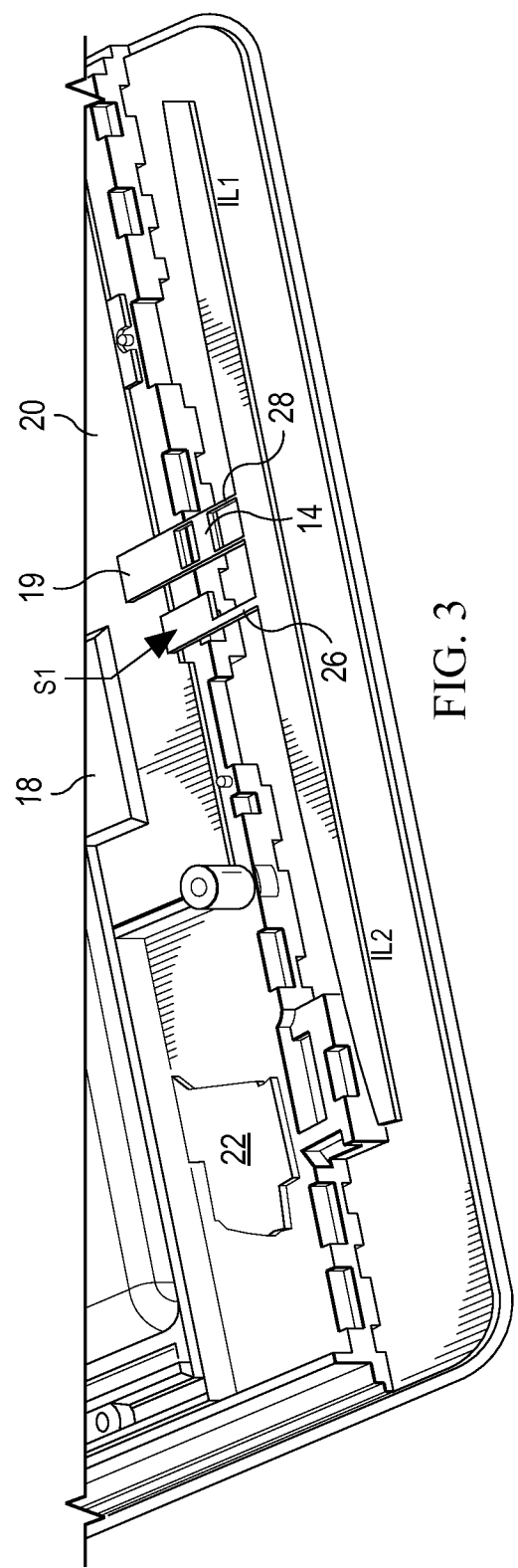
FIG. 3 illustrates a perspective view of one embodiment of the antenna layed out over a backplane at one end of a printed circuit board (PCB)

FIG. 3 illustrates a perspective view of one embodiment of device 10 including the antenna 12 with the passive matching network 14 layed out over a backplane 22 at one end of the printed circuit board (PCB) 20. The PCB 20 includes electronics 18 of the device 10, driving a first feedline 26 and a second switchable feedline 28 comprising the Pi-shaped antenna 12.

Figure 4:
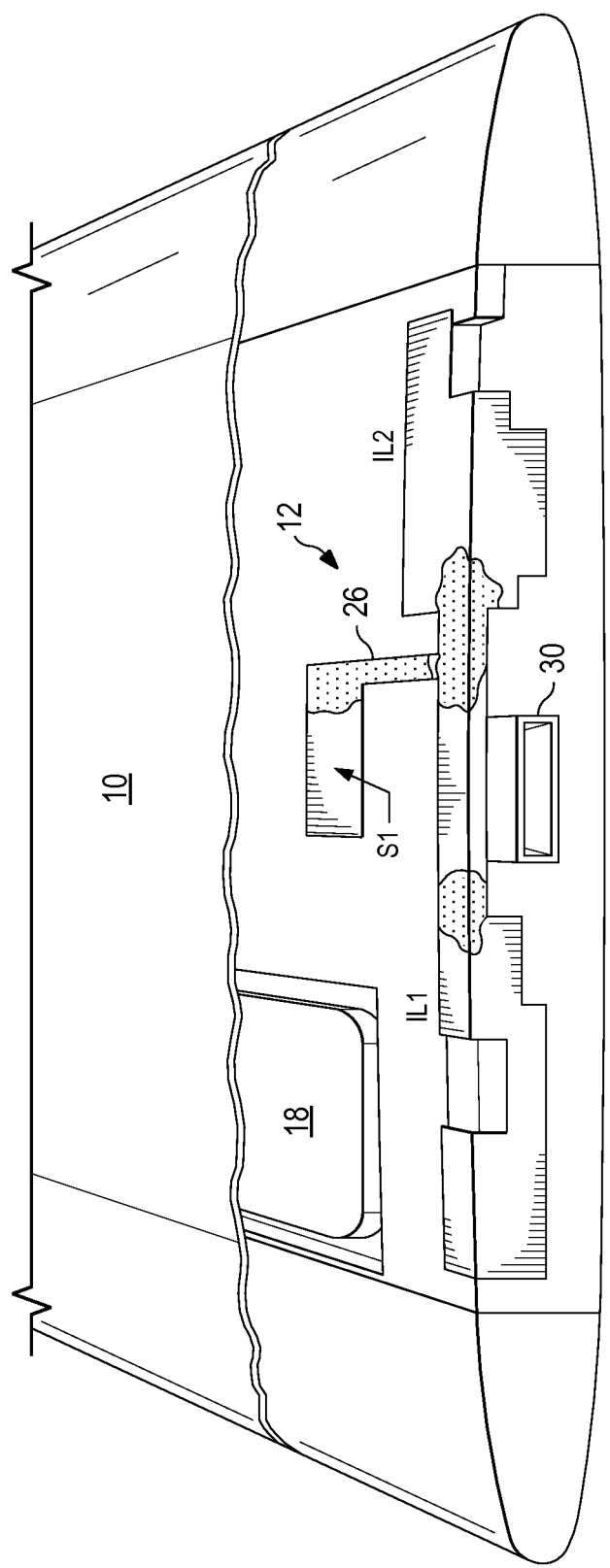
FIG. 4 illustrates a mobile device including an antenna and a USB connector at the center of the device.

FIG. 4 illustrates device 10 having the Pi-shaped antenna 12 formed at the distal end of the device 10, and proximate connector 30 which is coupled to electronics 18. For instance, the connector 30 may comprise a USB connector positioned in the center of the device, as shown. Advantageously, the coupling S1 forming the first arm of the antenna 12 is coupled to the shell of the connector 30 and the ground 22 to create another resonance covering the high band B7, thus expanding the bandwidth of the antenna 12. The coupling S1 can also be coupled to other device connectors 30, such as a speaker/earphone connector, a microphone connector, a memory slot connector, a receiver, a metal cover of the device, or any other components, or any other kinds of ground on the PCB board (at center or in corner) to create one more high band resonance, such as at 2.6 GHz to cover band B7. This is a new way to use the environment to improve antenna bandwidth for a portable mobile communication device. The distance between coupling S1 and the connector/components/ground on PCB board, the shape of coupling S1, the material between them, all effect antenna performance. For different phones/different environments, the shape of antenna 12, the device connectors and the location thereof may vary, and the S1 coupling in combination therewith creates the high band resonance.

Figure 5:
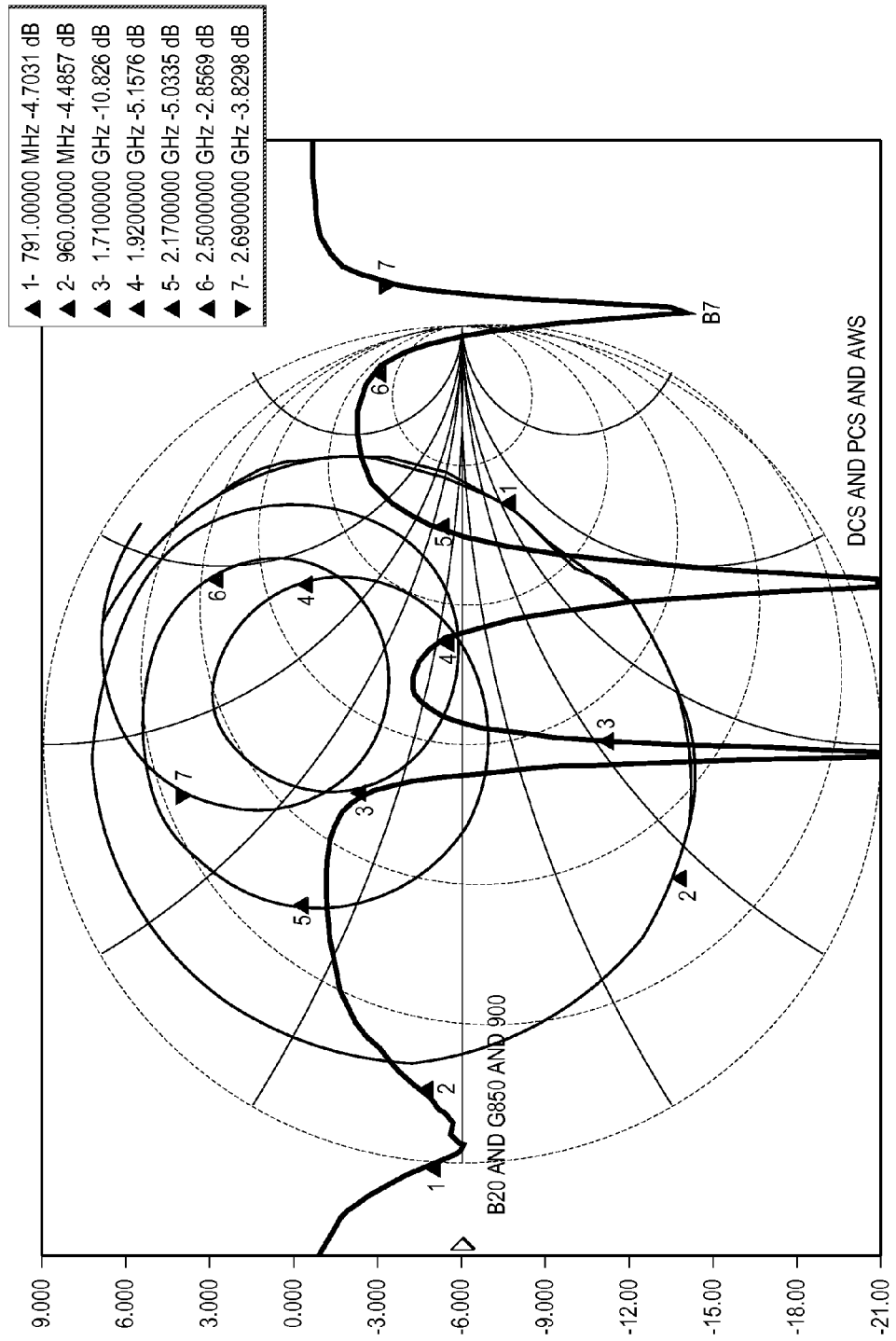
FIG. 5 illustrates a typical return loss for the antenna for band B20 and B7.

FIG. 5 illustrates a typical return loss for the antenna 12 having the passive impedance matching network 14 from band B20 to band B7.

Figure 6:
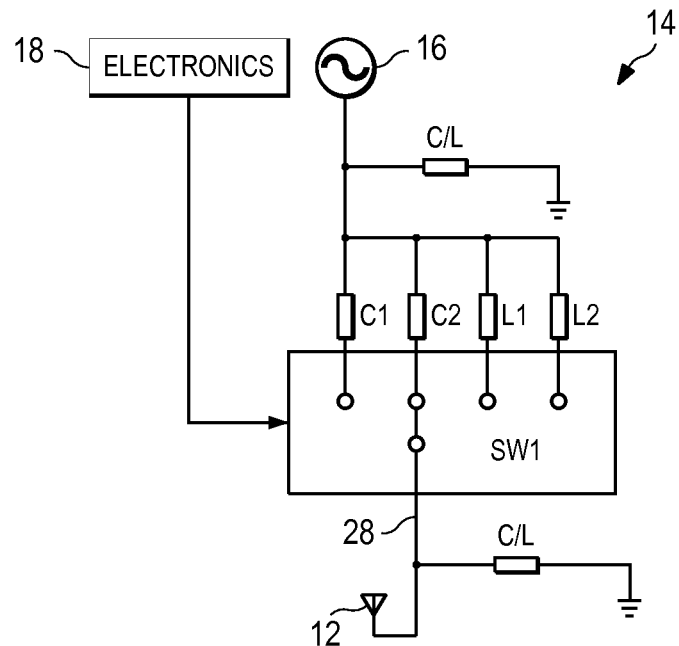
FIG. 6 illustrates the impedance matching network configured as a switchable network to selectively tune the driving circuit to the antenna for different bands.

FIG. 6 illustrates impedance matching network configured as a switchable impedance matching network. Impedance matching network 14 is configured to have two (2) states to more effectively tune the antenna 12 for two bands, such as a low band in a first state, such as B17 and B20, and a high band in a second state, such as B7. The impedance matching network 14 includes a switch SW1 controlled by driver 18 and configured to selectively configure the various components L1, L2, C1 and C2 in the first state and the second state. The switch SW1 may be a single pull four throw (SP4T), although other types of switches may be used and are within the scope of this disclosure.

Figure 7:
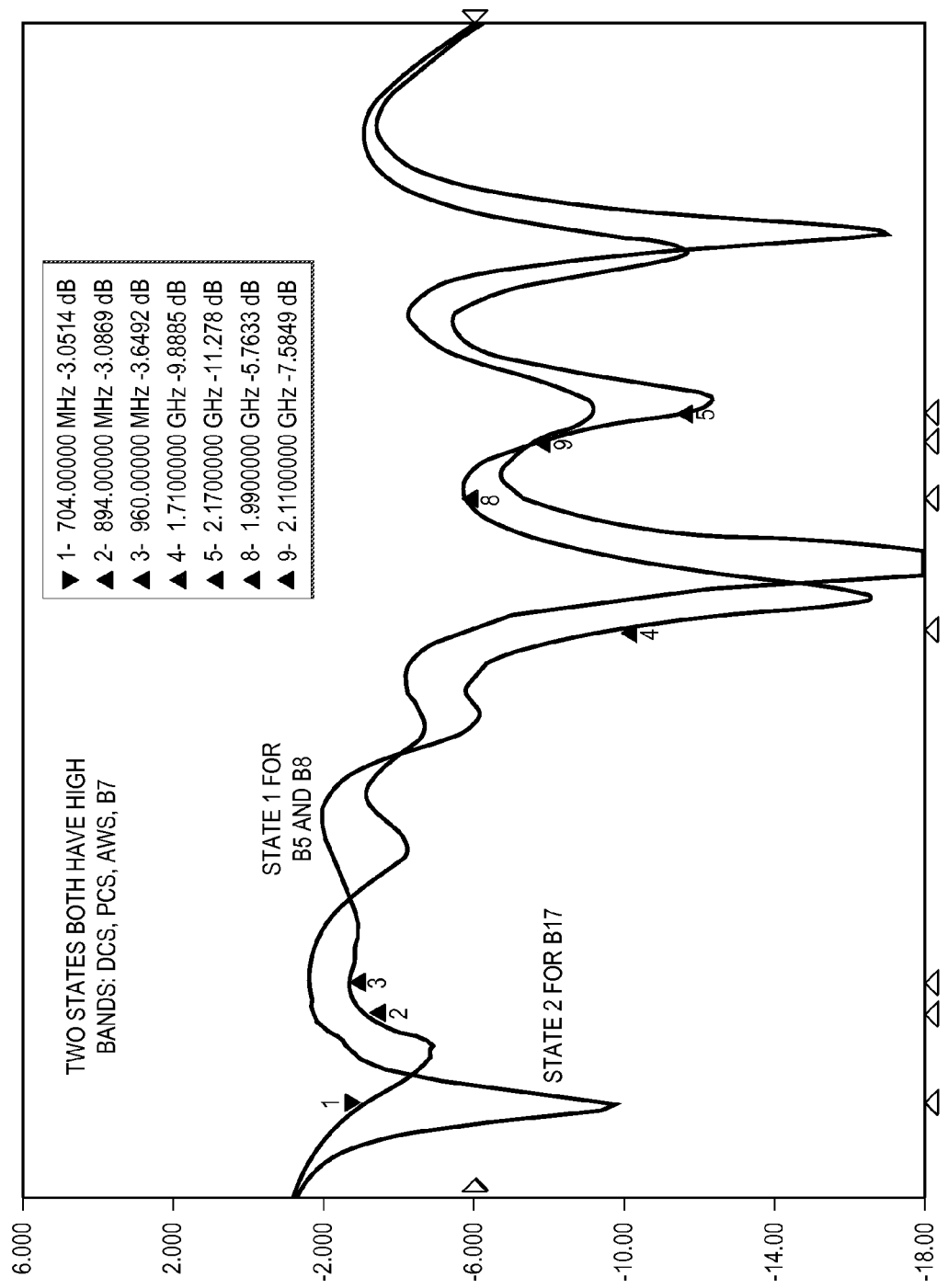
FIG. 7 illustrates a return loss for two different states.

FIG. 7 illustrates a return loss for the antenna 12 in the two different states, for state 1 and state 2. State 1 provides a reduced return loss for band B17 as compared to state 2, whereas state 2 provides a reduced return loss for bands B5 and B8 as compared to state 1. The electronics 18 selectively establishes the 2 states of operating the antenna 12, and more than 2 states are possible and within the scope of the present disclosure.

Figure 8:
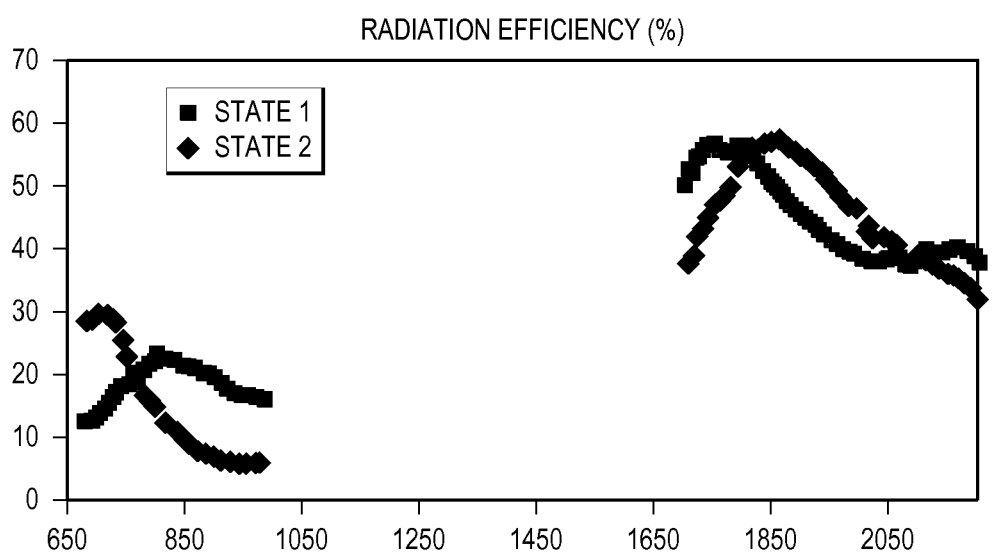
FIG. 8 illustrates radiation efficiency for two different states.

FIG. 8 illustrates the radiation efficiency of the antenna 12 in state 1 and state 2 for two bands, band B17 and band B7.

Figure 9:
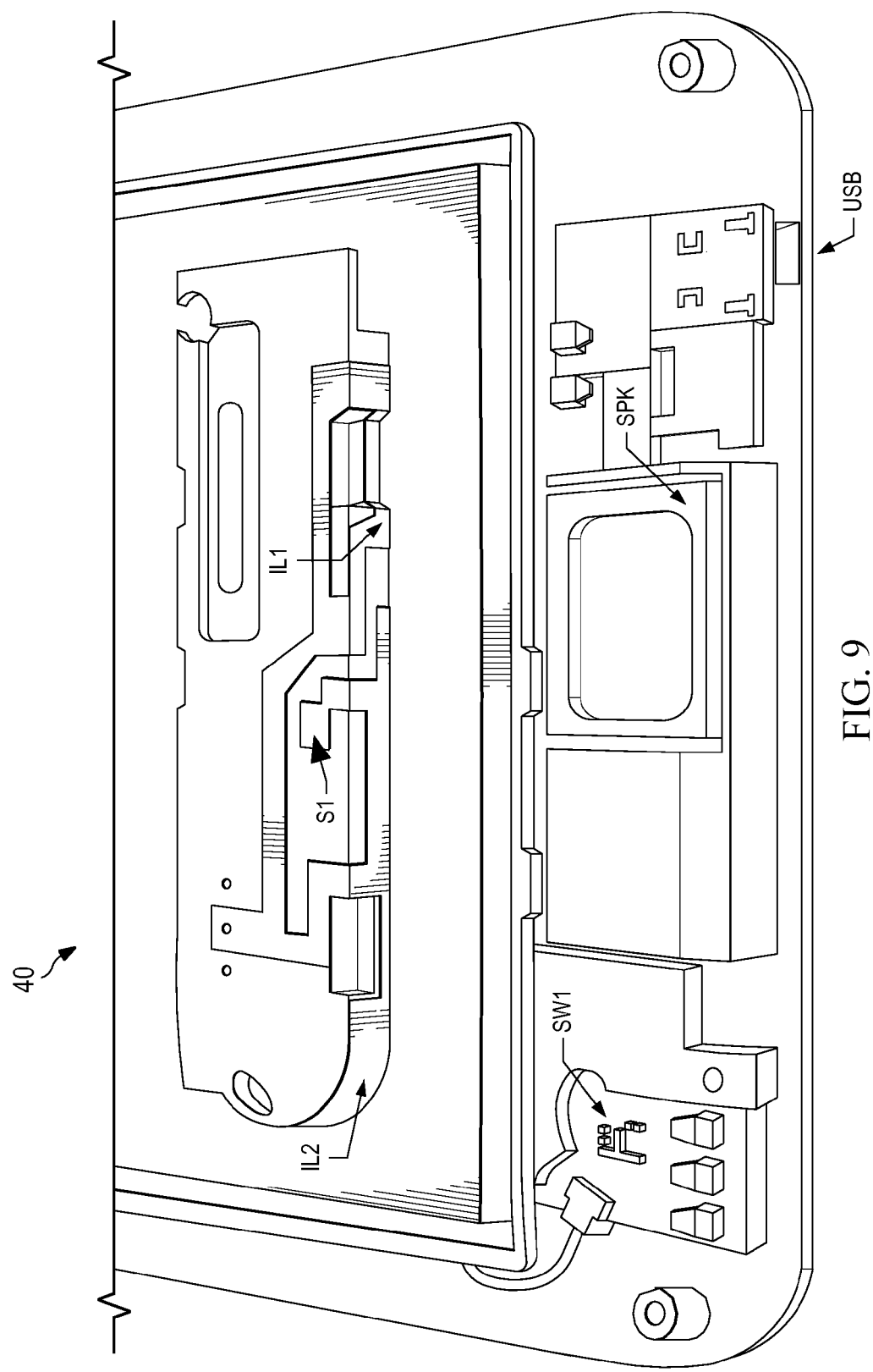
FIG. 9 illustrates another embodiment of a mobile device.

FIG. 9 illustrates a second embodiment of a device 40 with the Pi-shaped antenna 12 removed and placed on the back of the device 40 for illustration. The switchable impedance matching network 14 is shown in the left corner of device 40, and the USB connector is shown in the right corner.

The impedance matching network 14 can also include active components if desired. For instance, active components can provide gain control and/or beam steering may be established.

Advantageously, the capacitively coupled Pi-shaped antenna with a switchable impedance matching network enables advanced mobile devices, such as those providing 4G, 5G and other versions, to provide coverage in desired bands using a low profile antenna.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

The invention claimed is:

1. A wireless communication device, comprising:
   electronics disposed on a printed circuit board (PCB) and operable to communicate over multiple radio frequency (RF) bands; and
   a Pi-shaped antenna consisting of a radiating stripline, a first arm and a second arm formed in a shape of greek symbol Pi, the first arm and the second arm separately corresponding to two legs of the shape of the greek symbol Pi, the first arm including a coupling component of the Pi-shaped antenna,
   wherein the coupling component is coupled to a connector of the wireless communication device to provide a first resonance over a first band of the multiple RF bands, and wherein the second arm is coupled to the electronics via an impedance matching network to provide one or more second resonances over the multiple RF bands.

2. The wireless communication of claim 1, wherein the coupling component is coupled to the connector via capacitive coupling.

3. The wireless communication device of claim 1, wherein the connector has a shell, wherein the coupling component is coupled to the shell.

4. The wireless communication device of claim 1, wherein the impedance matching network is switchable and configured to match an impedance of the electronics to the Pi-shaped antenna in at least two states having different frequency ranges.

5. The wireless communication device of claim 4, wherein in a first state of the at least two states, the impedance matching network is operated to provide a resonance over a first frequency range covering the first band, and wherein in a second state of the at least two states the impedance matching network is operated to provide a resonance over a second frequency range not covering the first band.

6. The wireless communication device of claim 4, wherein the electronics are configured to selectively establish the at least two states.

7. The wireless communication device of claim 6, wherein the impedance matching network comprises a switch to enable selection of the at least two states.

8. The wireless communication device of claim 1, wherein the Pi-shaped antenna is disposed along an edge of a housing of the wireless communication device.

9. The wireless communication device of claim 1, wherein the multiple RF bands comprise the first band and a second band lower than the first band.

10. The wireless communication device of claim 9, wherein the first band comprises a Long Term Evolution (LTE) band B7 or LTE band B41.

11. The wireless communication device of claim 1, wherein the second arm is coupled through an impedance matching network to the electronics via a feedpoint to provide the one or more second resonances over the multiple RF bands.

12. The wireless communication device of claim 1, wherein the impedance matching network is controllably operated in at least two states having different frequency ranges.

13. The wireless communication device of claim 12, wherein the impedance matching network comprises a switch controlled to selectively switch between the at least two states.

14. The wireless communication device of claim 12, wherein the electronics comprises a drive circuit coupled to the impedance matching network to selectively switch between the at least two states.

15. The wireless communication device of claim 1, wherein the impedance matching network is on a backplane.

16. The wireless communication device of claim 1, wherein the first resonance is based on a dimension of the coupling component.

17. The wireless communication device of claim 1, wherein the first resonance is based on a shape of the coupling component.

18. The wireless communication device of claim 2, wherein the first resonance is based on material disposed between the coupling component and the connector in the device.

19. The wireless communication device of claim 1, wherein the connector is a speaker connector, a earphone connector, a microphone connector, a memory slot connector, a USB connector, a receiver or a metal cover of the device.

20. The wireless communication device of claim 1, wherein the coupling component is capacitively coupled to a ground of the PCB.

21. A wireless communication device, comprising:
electronics disposed on a printed circuit board (PCB) and operable to communicate over multiple radio frequency (RF) bands; and
a Pi-shaped antenna consisting of a radiating stripline, a first arm and a second arm formed in a shape of greek symbol Pi, the first arm and the second arm separately corresponding to two legs of the shape of the greek symbol Pi, the first arm including a coupling component of the Pi-shaped antenna,
wherein the coupling component is capacitively coupled to a ground of the PCB to provide a first resonance over a first band of the multiple RF bands, and
wherein the second arm is coupled to the electronics via an impedance matching network to provide one or more second resonances over the multiple RF bands.

22. The wireless communication device of claim 21, wherein the coupling component is coupled to a connector of the communication device.

23. The wireless communication device of claim 22, wherein the connector is a speaker connector, a earphone connector, a microphone connector, a memory slot connector, a USB connector, a receiver or a metal cover of the device.

24. The wireless communication device of claim 22, wherein the coupling component is capacitively coupled to the connector and wherein the first resonance is based on material disposed between the coupling component and the connector in the device.

25. The wireless communication device of claim 22, wherein the coupling component is capacitively coupled to the connector and wherein the first resonance is based on a dimension of the coupling component.

26. The wireless communication device of claim 22, wherein the coupling component is capacitively coupled to the connector and wherein the first resonance is based on a shape of the coupling component.

27. The wireless communication device of claim 21, wherein the multiple RF bands comprise the first band and a second band lower than the first band.

28. The wireless communication device of claim 21, wherein the first band comprises a Long Term Evolution (LTE) band B7 or LTE band B41.

29. The wireless communication device of claim 21, wherein the impedance matching network is switchable and configured to match an impedance of the electronics to the Pi-shaped antenna in at least two states having different frequency ranges.

* * * * *